(12) United States Patent
Crocker et al.

(10) Patent No.: US 11,209,571 B1
(45) Date of Patent: Dec. 28, 2021

(54) SYSTEM AND METHOD FOR THE CALIBRATION OF A HYDROPHONE LINE ARRAY IN A QUASI-DIFFUSE AMBIENT SOUND FIELD

(71) Applicant: The United States of America as represented by the Secretary of the Navy, Newport, RI (US)

(72) Inventors: Steven E Crocker, Bristol, RI (US); Ronald R Smalley, North Kingstown, RI (US)

(73) Assignee: The United States of America as represented by the Secretary of the Navy

(*) Notice: Subject to any disclaimer, the term of this patent is extended or adjusted under 35 U.S.C. 154(b) by 711 days.

(21) Appl. No.: 16/140,642

(22) Filed: Sep. 25, 2018

(51) Int. Cl.
*G01V 13/00* (2006.01)
*H04B 1/04* (2006.01)
*G01V 1/18* (2006.01)

(52) U.S. Cl.
CPC ............. *G01V 13/00* (2013.01); *G01V 1/186* (2013.01); *H04B 1/0475* (2013.01)

(58) Field of Classification Search
None
See application file for complete search history.

(56) References Cited

U.S. PATENT DOCUMENTS

| | | | | |
|---|---|---|---|---|
| 3,859,620 A * | 1/1975 | Percy | ................... | G10K 11/008 367/13 |
| 4,160,228 A * | 7/1979 | Hix | ........................ | G01V 13/00 181/110 |
| 5,504,714 A * | 4/1996 | Shonting | ................ | G01V 1/001 367/13 |
| 6,208,584 B1 * | 3/2001 | Skinner | ................... | G01H 3/005 367/13 |
| 8,576,657 B1 * | 11/2013 | Crocker | ................. | G01V 13/00 367/13 |

(Continued)

OTHER PUBLICATIONS

Acoustical Society of America (ANSI/ASA S1.1-2013), Acoustical Terminology, Standard, Oct. 14, 2013, pp. i-iii and 1-75.

(Continued)

*Primary Examiner* — Isam A Alsomiri
*Assistant Examiner* — Vikas Atmakuri
(74) *Attorney, Agent, or Firm* — James M. Kasischke; Michael P. Stanley

(57) ABSTRACT

A method is provided to measure a modulus of complex sensitivity of hydrophone data channels using a quasi-diffuse sound field. In the method, a radiation pattern representing shallow water sources directs to a location as a direct acoustic path and sound reflects to the location from the water bottom as a reflected acoustic path. At least one hydrophone receives the sounds at the location as acoustic signals with an acoustic intensity being the sound intensities along the acoustic paths. The sound intensity at the hydrophones also relates to a zenith angle and a bottom intensity reflection coefficient. The modulus of the frequency dependent sensitivity of the hydrophone is computed from measurements of the voltage output and voltages of reference hydrophones with the sound intensity as factor and with uncertainty reduced by averaging hydrophone sensitivities.

7 Claims, 5 Drawing Sheets

(56) References Cited

U.S. PATENT DOCUMENTS

| | | | |
|---|---|---|---|
| 9,001,614 B1* | 4/2015 | Crocker | G01V 13/00 367/13 |
| 9,551,811 B1* | 1/2017 | Crocker | G01V 13/00 |
| 9,835,764 B2* | 12/2017 | Crocker | G01V 13/00 |
| 2016/0091361 A1* | 3/2016 | Crocker | G01V 13/00 367/13 |

OTHER PUBLICATIONS

Eric W. Weisstein, Solid Angle, article, pp. 1-2, Wolfram Research.

A. Lee Van Buren, Joseph F. Zalesak, Robert M. Drake, Alexander E. Isaev, Alexander M. Enyakov, Christopher Purcell, Zhu Houqing, Wang Yuebing, Zhang Yue, Pierre Botha and Dieter Kruger, An International Key Comparsion of Free-Field Hydrophone Calibrations in the Frequency Range 1 to 500 kHz, paper, Sep. 2006, pp. 1366-1373,vol. 120, No. 3, J. Acoustic Soc. Am, USA.

Lawrence E. Kinsler, Austin R. Frey, Alan B. Coppens, James V. Sanders, Fundamentals of Acoustics, Selected chapters 6 and 7 from the book, pp. 149-166, pp. 188-190, USA.

Finn B. Jensen, William A. Kuperman, Michael B. Porter, Henrik Schmid,Computational Ocean Acoustics, chapter from the book, pp. 100-103, USA.

William S. Burdic, Underwater Acoustic System Analysis, chapter from the book, pp. 292-294, USA.

Robert J. Bobber, Underwater Electroacoustic Measurements, chapter from the book, pp. 41-43, USA.

Leo L. Beranek, Acoustical Measurements, chapter from the book, pp. 633-635, USA.

Julius S. Bendat, Allan G. Piersol, Random Data Analysis and Measurement Procedures, chapter from the book, pp. 48-53, USA.

Benjamin F. Cron, Charles H. Sherman, Spatial-Correction Functions for Various Noise Models, article, Nov. 1962, pp. 1732-1736,vol. 34 No. 11, J. Acoust. Soc. Am, USA.

Joint Committee for Guides and Metrology, Evaluation of Measurement Data-Guide to the Expression of Uncertainty in Measurements, Standard, Sep. 2008, pp. I-IX and 1-120.

International Electrotechnical Commission, Unwater Acoustic-Hydrophones-Calibration the Frequency Range 0.01 Hz to 1 MHz, Standard, pp. 1-76.

Acoustical Society of America (ANSI/ASA S1.20-2012), Procedures for Calibration of Underwater Electroacoustic Transducers, Standard, Feb. 17, 2012, pp. i-iv, and 1-53.

Acoustical Society of America (ANSI/ASA S1.6.-2016), Preferred Frequencies and Filter Band Center Frequencies for Acoustical Measurements Standard, Aug. 25, 2016, pp. i-iv and 1-7.

* cited by examiner

SYSTEM AND METHOD FOR THE CALIBRATION OF A HYDROPHONE LINE ARRAY IN A QUASI-DIFFUSE AMBIENT SOUND FIELD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

The present patent application is related to U.S. Pat. No. 9,835,764 entitled "SYSTEM AND METHOD FOR THE CALIBRATION OF A HYDROPHONE LINE ARRAY" by the inventors, Steven E. Crocker et. al.

BACKGROUND OF THE INVENTION

(1) Field of the Invention

The present invention is a method for calibration of a hydrophone line array in which the modulus of the complex sensitivity of the hydrophone data channels in a line array is measured over a broad range of frequencies using a quasi-diffuse sound field in an open body of water.

(2) Description of the Prior Art

Secondary calibration of a hydrophone or a towed array is often performed using a free-field comparison method (See "American National Standard: Procedures for Calibration of Underwater Electroacoustic Transducers" (2012) ANSI/ASA S1.20). In the comparison method, a calibrated reference standard hydrophone with known free-field voltage sensitivity measures the acoustic field that is transmitted by an acoustic projector. The free-field voltage sensitivity of a hydrophone is defined as the ratio of the open circuit voltage of the hydrophone to sound pressure in the undisturbed free field in the position of the reference center of the hydrophone if the hydrophone were removed (see "International Electrotechnical Commission, Underwater Acoustics—Hydrophones—Calibration in the frequency range 0.01 Hz to 1 MHz" (2006) IEC 60565).

The free-field voltage sensitivity is a complex quantity with a modulus and a phase. The modulus is expressed as decibels relative to one volt per micro-pascal (e.g., dB re 1V/uPa) and the phase is expressed in degrees relative to the phase of the acoustic field.

A fundamental requirement of the free-field comparison calibration method is using an acoustic projector to transmit an acoustic signal with an intensity that is sufficient to overcome measurement noise including ambient noise in the test environment as well as electronic self-noise of the test article and a reference hydrophone.

This requirement is addressed in the prior art by using an acoustic projector to transmit acoustic signals observed by the device under test and the reference hydrophone, either sequentially with a comparison replacement calibration or simultaneously with a comparison side-by-side calibration.

A requirement of comparison calibration is that the calibration measurements are performed in an acoustic free-field. Among the sources of measurement uncertainty are acoustic scattering from the hydrophone mount (or vibrations conducted by the mount) and interference from acoustic reflections which lead to a lack of free-field conditions.

Calibration of hydrophone line arrays taught by Percy (U.S. Pat. No. 3,859,620) do not satisfy these fundamental acoustic calibration requirements. First, the desired range of frequencies for the calibrations include frequencies that are substantially less than the minimum operating frequency of standard underwater acoustic projectors that transmit calibration signals into the water. Second, the Percy reference presupposed the existence of a water filled anechoic chamber in which acoustic boundary reflections were absent. The presupposed anechoic test environment does not exist.

The cited reference also presupposed the existence of an acoustically transparent measurement apparatus. The apparatus can be acoustically transparent over a range of frequencies; however, a measurement apparatus that can support a hydrophone line array and remain acoustically transparent at frequencies up to 10 kHz is unknown. Therefore, the measurement environment and apparatus create interference from acoustic reflections which leads to a lack of free-field conditions that significantly increases measurement uncertainty (See "American National Standard: Procedures for Calibration of Underwater Electroacoustic Transducers" (2012) ANSI/ASA S1.20).

Crocker (U.S. Pat. No. 9,551,811) addresses inadequate signal intensity at a very low frequency. In the reference, a calibration method is disclosed that uses sound in a natural environment as the calibration signal. It was shown that the acoustic pressure observed at any two field locations in the volume of water occupied by the measurement apparatus had equal intensity and were correlated for acoustic wavelengths that were large in relation to the distance between the observations. While these features enabled calculation of the complex voltage sensitivity (i.e., modulus and phase) of the device under test; the requirement for correlated ambient sound measurements limited the maximum frequency at which the calibrations could be performed to approximately 60 Hz.

Crocker et al. (U.S. Pat. No. 9,385,764) addresses reflections and scattering from boundaries in a test environment and by a measurement apparatus. The reference teaches a method in which calibrated reference hydrophones observe the sound field created by an acoustic projector in the volume of water occupied by the measurement apparatus. Acoustic data collected by reference hydrophones is then used to estimate the complex acoustic pressure at all points on the hydrophone line array with the estimate based on an empirical model of the acoustic field.

The invention of the cited reference reduces measurement uncertainty to a maximum frequency of approximately 800 Hz when using eight calibrated reference hydrophones to observe the acoustic pressure field. The upper frequency limit may be improved by sampling the acoustic field with finer spatial resolution; thereby, increasing the number of calibrated reference hydrophones needed. The lower frequency limit is approximately 30 Hz which is the minimum operating frequency of standard underwater acoustic projectors.

Acoustic calibration techniques using diffuse sound fields are also known in the prior art. Diffuse sound field calibration techniques may provide relief from some of the problems noted, particularly at higher frequencies. A diffuse sound field (defined as the time average of the mean-square sound pressure) is the same everywhere and the flow of acoustic energy in all directions is equally probable (See "American National Standard: Acoustical Terminology" (2013) ANSI/ASA S1.1).

Microphone calibration methods based on diffuse sound fields are well known (See Beranek, L. L. (1988) Acoustical Measurements, 2nd Ed., American Institute of Physics, pp. 633-635). The measured quantity is the diffuse field sensitivity defined as the quotient of the root-mean-square open circuit output voltage due to sound waves arriving almost simultaneously with equal probability from all directions, by the root-mean square sound pressure at that location due to the same sound waves but in the absence of the electroacoustic transducer (See "American National Standard: Acoustical Terminology" (2013) ANSI/ASA S1.1).

While a diffuse sound reciprocity calibration method for hydrophones is described by Bobber; a tank or other reverberant body of water would be too large to be useful for underwater diffuse-sound calibration measurements because of high sound speed and consequently long acoustic wavelengths (See Bobber, R. J., Underwater Electroacoustic Measurements (1988) Peninsula Publishing, Los Altos, pp. 41-43). As a result, neither national nor international standards describe diffuse sound field calibration methods for hydrophones (See "American National Standard Procedures for Calibration of Underwater Electroacoustic Transducers" (2012) ANSI/ASA S1.20 and "International Electrotechnical Commission, Underwater Acoustics—Hydrophones—Calibration in the frequency range 0.01 Hz to 1 MHz" (2006) IEC 60565).

Practical hydrophone calibration methods employing diffuse sound fields are unknown. However, the use of a diffuse sound field for calibration of a hydrophone line array using the prior art measurement apparatus has important advantages over those methods, particularly at higher frequencies.

SUMMARY OF THE INVENTION

It is therefore a primary object and general object of the present invention to measure the modulus of the complex sensitivity of the hydrophone data channels in a line array over a broad range of frequencies using a quasi-diffuse sound field in an open body of water.

To attain the object of the present invention, a method is provided using a test fixture to arrange a hydrophone line array into a cylindrical volume. Once the test fixture is submerged; acoustic signals of a natural noise environment are received by calibrated reference hydrophones and transmitted to a data processor with a modulus of the free-field voltage sensitivity for hydrophone data channels in the array measured over a range of frequencies. The hydrophones being calibrated are also referred to as the devices under test.

More specifically, an ambient sound field is modeled by a uniform distribution of sound sources located at a shallow depth beneath a water surface with the sound field being the calibration signal. Each sound source is created by wind, waves and bubbles operating on, or slightly beneath the water surface. Due to the proximity of the water surface, the sound intensity radiated by the sound sources produces a directional radiation pattern; whereby, the sound intensity varies with the angle of the pattern.

The sound from each source location propagates directly from the directional source to a location in the field where the sound may be received by either the device under test or the reference standard hydrophone. This is a direct acoustic path. The sound from each directional source also propagates to the location after reflection from the bottom of the body of water. This is a reflected acoustic path.

Sound emitted in a directional radiation pattern of the near surface directional source and reflected from the bottom is modeled as sound radiated directly from a fictitious image source beneath the bottom along a fictitious acoustic path that extends from the source to a receiver.

Sound emitted in a directional radiation pattern of the near surface directional source may also be reflected in multiple directions from the bottom and the water surface. In these instances, each reflected acoustic path is modeled as the sound radiated from a fictitious image source and propagated directly from the fictitious image source to a location occupied by a receiver. The total acoustic intensity at the receiver is the sum of the intensities due to sounds propagating along the direct acoustic path and the reflected acoustic paths.

Assuming that the directional radiation pattern takes on the well-known dipole response pattern; the total sound intensity due to a distribution of near-surface dipoles and propagated to the submerged receiver is the same everywhere. However, these sounds do not arrive at the acoustic receiver with equal probability from all directions.

The intensity of sound generated by a distribution of near surface dipole sources and observed at the receiver is a function of the zenith angle and intensity reflection coefficient of the bottom. The differential intensity received over different reflected acoustic paths varies with the number of bottom reflections, where each reflection reduces the intensity of sound by a factor equal to an intensity reflection coefficient.

The time averaged reflected intensity at the acoustic receiver is estimated as the sum of the intensities received by numerous reflected acoustic paths based on the number of bottom reflections, the number of surface reflections, the intensity reflection coefficient and the time averaged intensity radiated vertically from a uniform distribution of near-surface dipoles. The time averaged intensity at the acoustic receiver results from the sum of these direct and reflected intensities. The total intensity observed at the acoustic receiver is due to a uniform random distribution of dipole sources with a mean intensity at the water surface.

The desired measurement is the modulus of the free-field voltage sensitivity of the hydrophones in the line array, defined as the ratio of the open circuit voltage output by the hydrophone to the acoustic pressure at the hydrophone when excited by a progressive wave field in an unbounded medium absent any contribution from boundary reflections.

However, the acoustical measurements employed are performed using an arbitrary sound field with quasi-diffuse properties. As such, the actual measurement may be closer to the diffuse-field voltage sensitivity than the free-field sensitivity. Subject to certain constraints; the two quantities will be equal.

The diffuse-field voltage sensitivity of a hydrophone is defined as the ratio of the root-mean-squared open circuit voltage output by the hydrophone and the root-mean-squared acoustic pressure in the diffuse-sound field at the hydrophone. If the hydrophone is not omnidirectional then the two sensitivities are different and are related by a directivity factor.

If a hydrophone is omnidirectional, then the diffuse-sound and free-field voltage sensitivities are the same and a diffuse-sound field can be used to measure the free-field voltage sensitivity of the hydrophone. In particular, the free-field voltage sensitivity of a device under test hydrophone may be determined from acoustical measurements performed in an arbitrary (e.g., quasi-diffuse) sound field if the device under test hydrophone and the reference hydrophone used for the comparison are both omnidirectional.

Finally, the modulus of the free-field voltage sensitivity of the device under test hydrophone can be measured in an arbitrary sound field, to include a quasi-diffuse sound field in an open body of water, if the device under test hydrophone and the reference hydrophone used for the comparisons are small with respect to an acoustic wavelength over the calibration frequency band.

The modulus of the frequency dependent sensitivity of a $i^{th}$ hydrophone data channel in the towed sensor array is computed from time dependent measurements of the voltage output by that hydrophone and by time dependent voltages observed by reference hydrophones as the ensemble average of acoustic comparisons between the calibrated reference standard hydrophones and the $i^{th}$ array hydrophone.

Measurement uncertainty is reduced by taking the ensemble average of the sensitivities computed from observations of the device under test and the reference hydrophones distributed over the test fixture. Standard procedures for estimation of measurement uncertainty decompose the combined standard uncertainty into a Type A component that is determined by the statistical analysis of repeated measurements and a Type B component that is the product of scientific judgement.

Significant contributors to the Type A uncertainty include a relatively low signal-to-noise ratio (SNR) characteristic of calibration methods that rely on the natural sound field for the calibration signal and variations in the sound field intensity with location due to differences between the assumed and actual sound generation mechanisms; the presence of the test fixture in the sound field; and local sources of sound that may exist near the test fixture.

The Type B uncertainty includes uncertainties in the reference sensitivities, uncertainties in the data processor signal conditioning and analog-to-digital conversion electronics, electrical losses when transmitting the electrical signals and any electromagnetic interference that may exist. Among these contributions, the uncertainty in sensitivity of the reference hydrophones is likely to dominate the Type B component. The Type B uncertainty can thus be calculated by the uncertainty of the reference standard calibrations. The combined standard uncertainty for the $i^{th}$ device under test is then the root-sum-of-squares of the Type A and Type B components.

The method can represent the measured sensitivities as a set of probability density functions for the sensitivity of each hydrophone expressed at each frequency or frequency band. Assuming normally distributed data, the probability density function for the true value of the sensitivity of the $i^{th}$ hydrophone at a frequency or in a frequency band is given by a well-known Gaussian distribution.

Since the true hydrophone sensitivity is represented as a probability density function; the sensitivity can be integrated across the range of acceptable sensitivity defined by the manufacturing specification for a given frequency or frequency band using standard statistical methods.

The diffuse sound field in the method of the prior art for microphone calibrations by a single acoustic source interacting with engineered boundaries designed to disrupt discrete room modes and to diffuse the sound energy evenly throughout the volume of the room in which the calibration measurements are performed.

By dispensing with the acoustic projector, the present invention avoids the problems created by the interaction of a spherically divergent and coherent sound field with a cylindrically symmetric measurement apparatus. Additional benefits derive from the calibrated reference hydrophones used to observe the sound field; provide an improved estimate of the temporal and spatial average of sound intensity throughout the measurement volume and to estimate the uncertainty in the calibration measurements for the hydrophones that are calibrated.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 1:
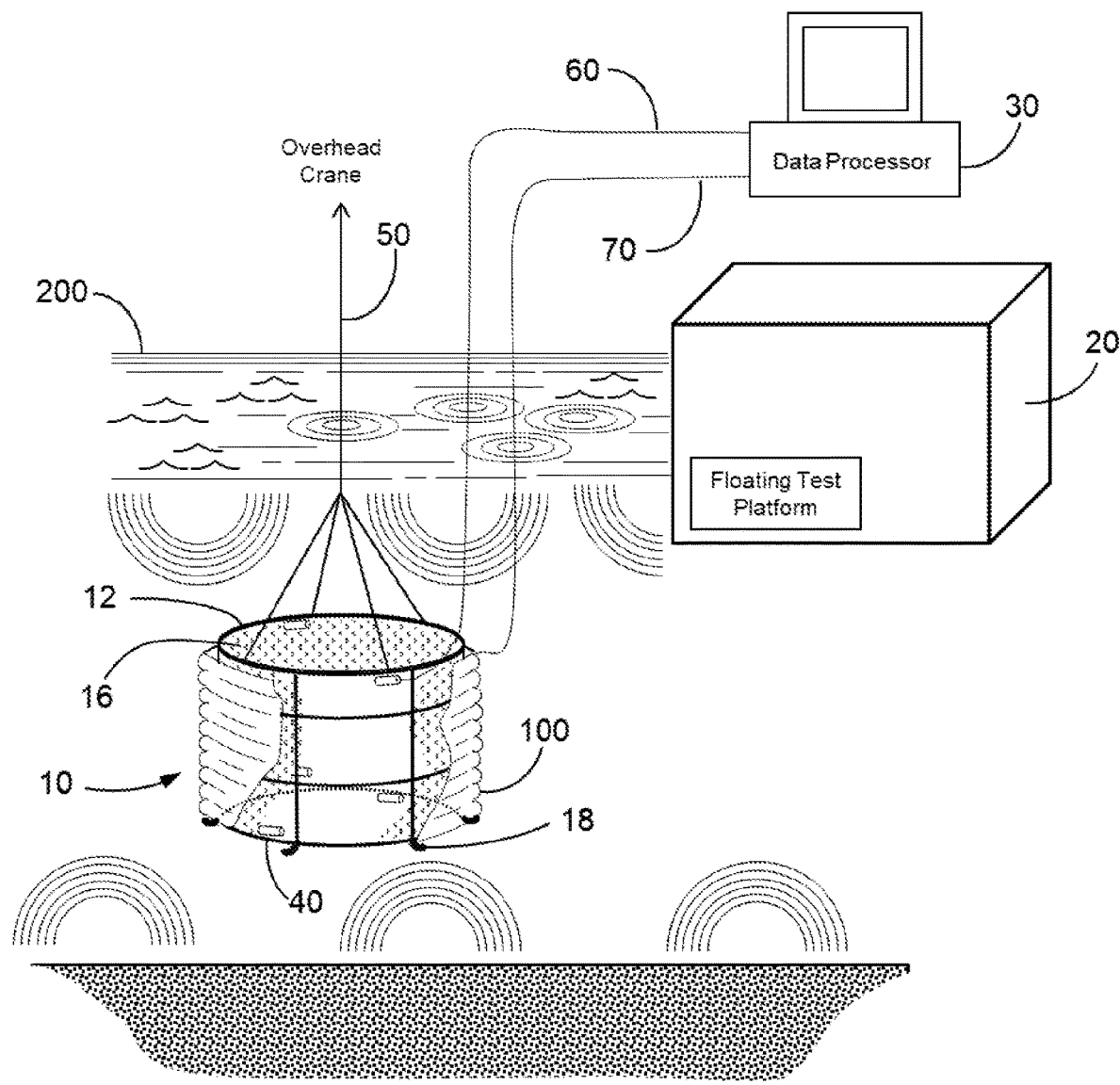
FIG. 1 depicts a prior art measurement system used to collect acoustic data that is processed by the method of the present invention.

Referring now to the drawings, and more particularly to FIG. 1, a prior art cylindrical test fixture 10 is shown. The test fixture 10 is disclosed by Percy (U.S. Pat. No. 3,859,620) with improvements incorporated herein by reference to Crocker (U.S. Pat. No. 9,551,811) and Crocker (U.S. Pat. No. 9,835,764) to arrange an array into a cylindrical volume that is compact relative to an array aperture. The method of the present invention also uses a floating test platform 20, a data processor 30 and a plurality of calibrated reference standard hydrophones 40 to acquire the acoustic data used to perform the acoustic calibrations.

As illustrated, a hydrophone line array 100 is helically fixed to the cylindrical test fixture 10. The test fixture 10 comprises circular tubes 12 joined by supports and covered with a wire mesh 16 that is open to the passage of acoustic waves. A plurality of brackets 18 are affixed at the bottom of the fixture 10 to support the line array 100. The fixture 10 is raised and lowered using a cable 50.

Once the cylindrical test fixture 10 is beneath a water surface 200; acoustic signals of the ambient noise environment are received by one or more calibrated reference standard hydrophones 40. Signals from the hydrophones 40 are transmitted over cables 60 to the data processor 30. Signals from the hydrophone line array 100 are transmitted over a cable 70 to the data processor 30. Signals transmitted by the hydrophone line array 100 may be either analog or digital, and need not be accurately synchronized with signals provided by the reference hydrophones 40. The measurement is typically performed from the floating test platform 20.

The method measures a modulus of the free-field voltage sensitivity for hydrophone data channels in the hydrophone line array 100 over a broad range of frequencies. The hydrophones of the towed array 100 being calibrated are also referred to as the devices under test (DUT). Ambient sound in the natural environment is the calibration signal.

Due to electronic self-noise, this method is used where power output by the devices under test and the reference hydrophone 40 (due to electronic self-noise) are substantially less than the power output in response to the ambient sound field. This limits use to low noise acoustic sensor systems where a calibration signal-to-noise ratio is the quotient of the power output of the devices under test when immersed in the water and the electronic self-noise power of the devices. However, it is common for towed arrays designed for scientific, geophysical and naval applications to be designed with low electronic-noise levels. It is also common to design calibrated reference hydrophones with low electronic self-noise levels.

The prior method by Crocker for calibrating the acoustic data channels in a hydrophone line array using a naturally occurring sound field in a body of water stipulated that the sound field observed by a device under test at one location on the measurement apparatus was highly correlated with the sound field observed by a reference standard hydrophone at a different location on the cylindrical text fixture with a maximum separation distance of a few meters (e.g., three meters). A significant factor is that the calibration method was limited to the measurement of complex free-field voltage sensitivity (i.e., modulus and phase) at a range of frequencies less than 60 Hz.

The present method significantly extends the maximum frequency at which the hydrophones in the line array 100 can be calibrated using a naturally occurring sound field in an open body of water. However, extending the upper limit of the frequency band violates the stipulation that the ambient sound field is correlated over the distances spanned by the test fixture 10. As a direct result of relying on uncorrelated sound observations between a device under test and the calibrated reference hydrophone 40; only the modulus of the complex free-field voltage sensitivity of the device under test can be measured accurately.

Figure 2:
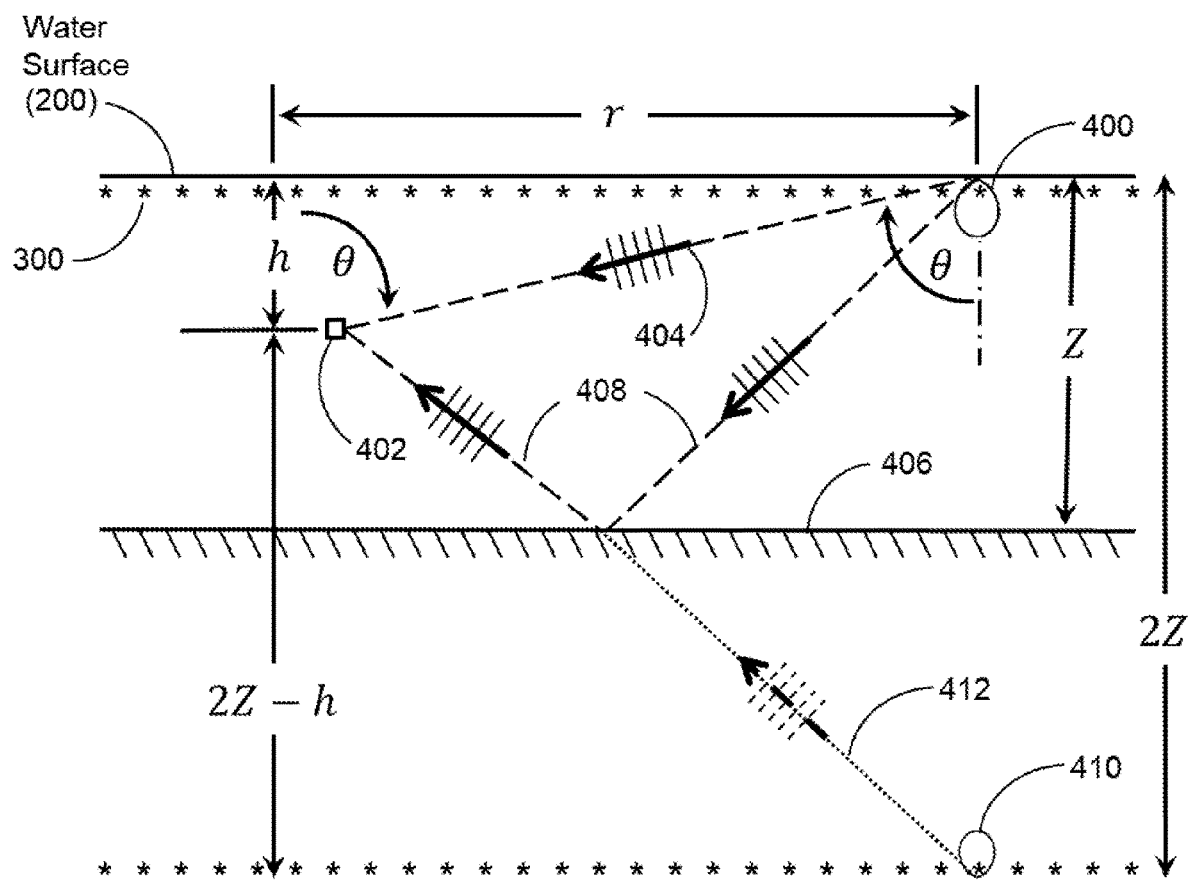
FIG. 2 depicts a cross-section of an open body of water in which calibration measurements are performed with a direct acoustic path and a reflected acoustic path.

Referring to FIG. 2, the ambient sound field is modeled by a uniform random distribution of sound sources 300 located at a relatively shallow depth beneath the water surface 200. It is assumed that the speed of sound is nearly constant throughout the body of water and that the effect of refraction is negligible over generated acoustic path lengths from the sound sources.

Each sound source 300 is created by wind, waves and bubbles operating on, or slightly beneath the water surface 200. Sound is thus radiated into the water from acoustic sources such as slightly submerged splashes and bubbles. In particular, the sound sources 300 are generally located within a quarter wavelength of the water surface 200 for the radiated sounds and used for calibration of the hydrophone line array 100 over the range of frequencies addressed by the method (i.e., up to 10 kHz).

Due to the proximity of the water surface 200, the intensity of sound radiated by the sound sources 300 produces a directional radiation pattern 400. The sound intensity of the radiation pattern 400 varies with the angle of the pattern. Modeling surface generated sound assumes an angular distribution of acoustic intensity that varies as $\cos^x \theta$ where $\theta$ is the angle with respect to the zenith and x is an arbitrary positive exponent (See Burdic, W. S. (1991) Underwater Acoustic Systems Analysis, Prentice Hall, Englewood Cliffs, N.J., pp. 292-294).

The sound from each source location propagates directly from the directional source 400 to a location 402 in the field where the sound may be received by either the device under test or the reference standard hydrophone 40. This acoustic path is a direct acoustic path 404.

The sound from each directional source 400 also propagates to the location 402 after reflection from the bottom 406 of the body of water. This acoustic path is a reflected acoustic path 408.

Analysis of acoustic propagation in bounded environments is often performed using a method of images (See Jensen, F. B., et. al. (2000) Computational Ocean Acoustics, Springer-Verlag, New York, N.Y., pp. 100-103) where reflected acoustic paths are modeled as direct acoustic paths for sound radiating from fictitious image sources located opposite the last reflecting boundary at a predetermined distance from that boundary.

Referring again to FIG. 2, sound emitted in a directional radiation pattern of the near surface directional source 400 and reflected from the bottom 406 is modeled as sound radiated directly from a fictitious image source 410 beneath the bottom along a fictitious acoustic path 412 that extends from the source to a receiver at the location 402. The use of image sources simplifies geometric relations used to describe reflected acoustic paths; however, the use of image sources does not change the analysis result.

Figure 3:
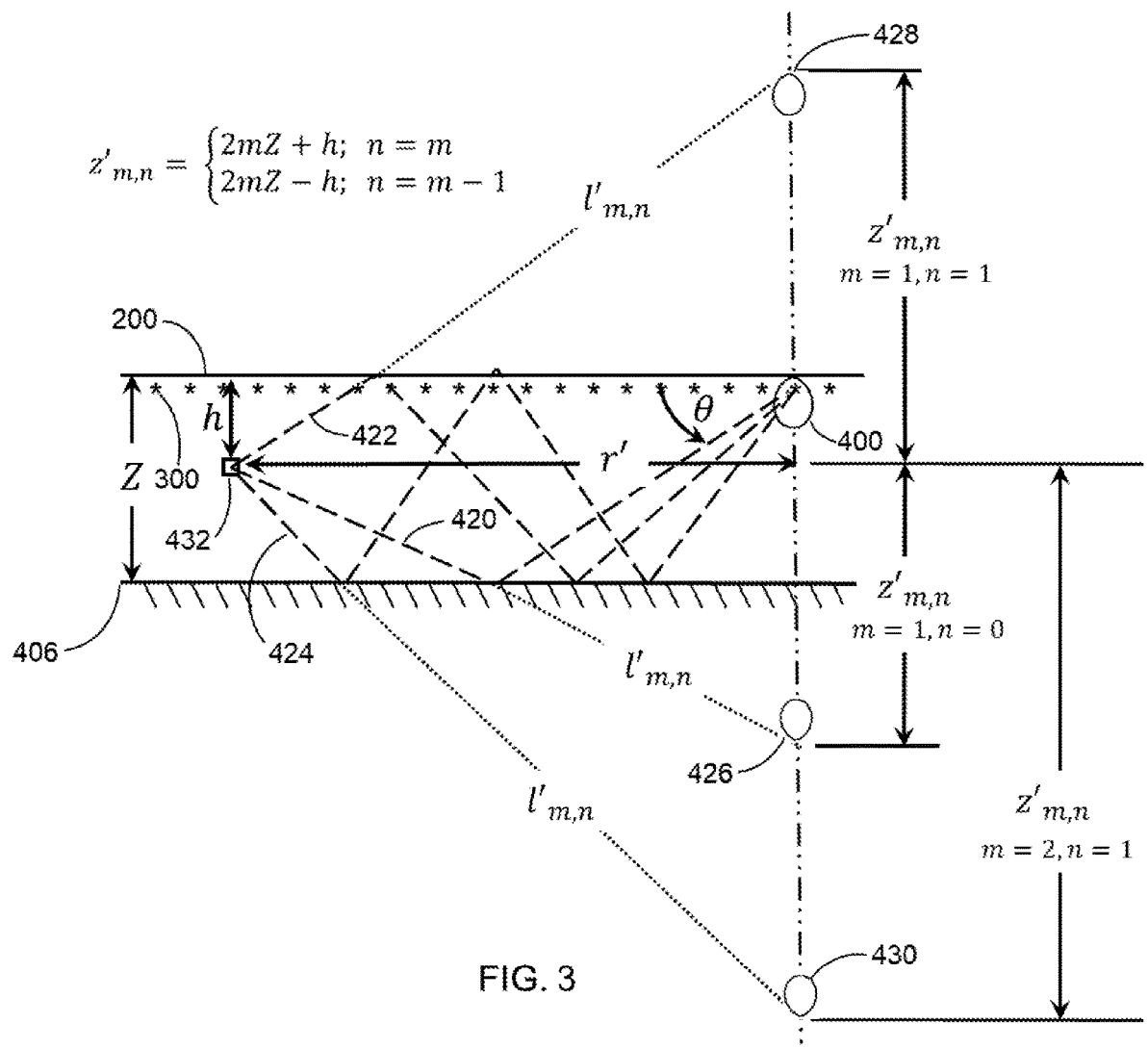
FIG. 3 depicts a cross-section of an open body of water with multiple reflected acoustic paths.

Referring to FIG. 3, sound emitted in a directional radiation pattern of the near surface directional source 400 may also be reflected in multiple directions from the bottom 406 and the water surface 200. In these instances, each multiply reflected acoustic path 420, 422, 424 is modeled as the result of sound radiated from a fictitious image source 426, 428, 430 and propagated directly from the fictitious image sources to a receiver 432 at the field location 402.

The total acoustic intensity at the receiver 432 is the sum of the intensities due to sounds propagating along the direct acoustic path 404 and the reflected acoustic paths 408, 420, 422 and 424. The acoustic field intensity is controlled by contributions from the direct acoustic path 404 and the reflected acoustic paths 408, 420, 422 and 424.

Figure 4:
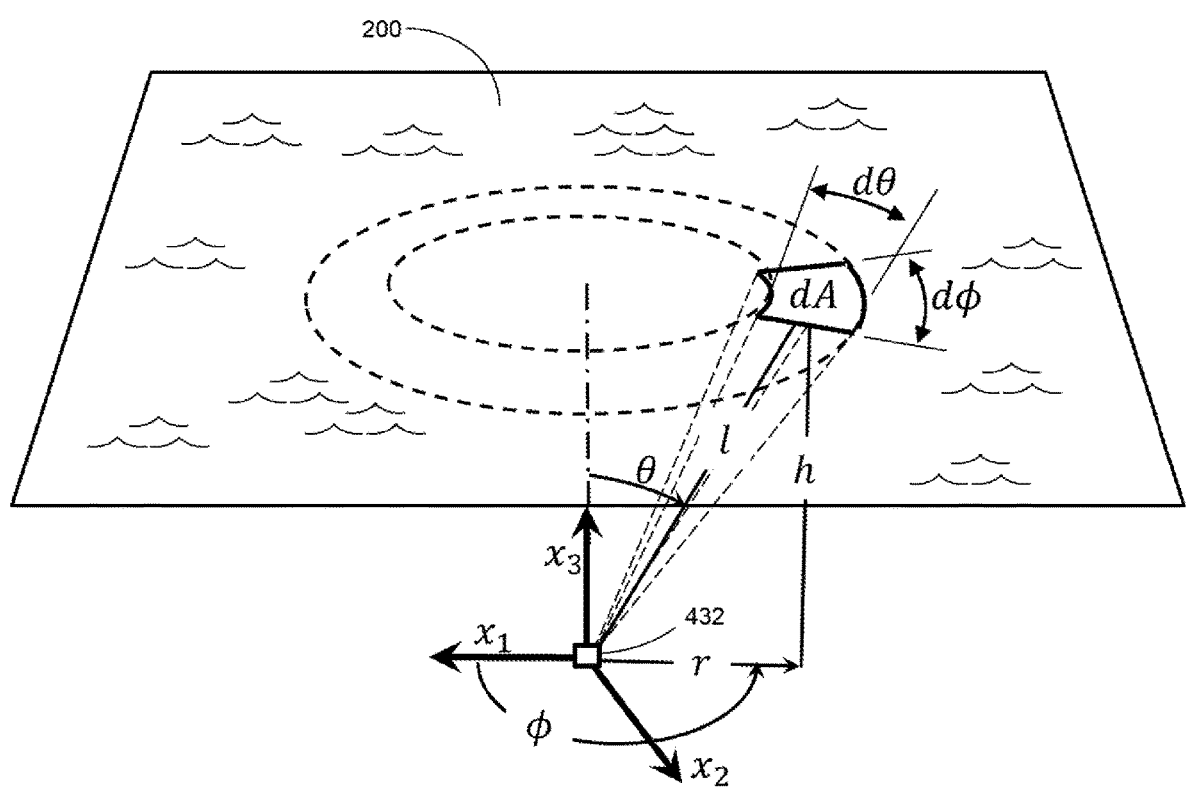
FIG. 4 depicts a region on the water surface that contributes to the time averaged acoustic intensity observed by a submerged receiver over a direct acoustic path.

Radiation of sound directly from the water surface 200 to the receiver 432 is depicted in FIG. 4. In the figure, sounds are generated at the water surface 200 by the action of wind, waves and splashes on the surface. The time averaged intensity of sound radiated directly from the water surface 200 to the acoustic receiver 432 at some depth below the surface is $I_D$ where $I_o$ is the acoustic intensity radiated in the vertical direction in watts per square meter and $\theta$ is the zenith angle as shown by Equation (1). Since the acoustic receiver 432 is located beneath the water surface 200, the range of zenith angles that contribute to the direct acoustic path are limited to 0 to $\pi/2$ radians (i.e., 0 to 90 degrees).

$$I_D(\theta) = I_o \cos^x \theta, \{\theta | 0 \leq \theta \leq \pi/2\} \tag{1}$$

The differential intensity $dI_D$ that radiates directly from the differential surface area dA to the acoustic receiver 432 is given by Equation (2) where l is the distance from the differential area dA to the receiver 432.

$$dI_D = \frac{I_o \cos^x \theta}{l^2} dA \tag{2}$$

The differential area dA from which sounds are radiated is given by Equation (3) where r is the horizontal distance from the acoustic receiver 432 to the source of sound dA, dr is the differential distance and $d\phi$ is the differential azimuth angle in standard spherical coordinates.

$$dA = r \, dr \, d\phi \tag{3}$$

Substitution of Equation (3) into Equation (2) provides Equation (4) as a differential intensity $dI_D$ that radiates directly from the surface area dA to the acoustic receiver 432.

$$dI_D = \frac{I_o \cos^x \theta}{l^2} r\, dr\, d\phi \tag{4}$$

The horizontal distance r is given by Equation (5) where h is the depth below the water surface 200 of the acoustic receiver 432. The differential distance dr is given by Equation (6) as the differential of Equation (5). The distance l from dA to the receiver 432 below the surface is given by Equation (7).

$$r = h \tan \theta \tag{5}$$

$$dr = h \sec^2 \theta\, d\theta \tag{6}$$

$$l = h \sec \theta \tag{7}$$

It is now assumed that the directional radiation pattern 400 of the near-surface sources 300 takes on the well-known dipole response pattern such that the exponent x=2 (See Cron, B. F. and Sherman, C. H. (1962) "Spatial Correlation Functions for Various Noise Models," J. Acoust. Soc. Am., vol. 34, pp. 1732-1736) and the differential intensity $dI_D$ at the acoustic receiver 432 due to the direct radiation of sound from a distribution of near-surface dipole sources (such as waves and wind) is given by substitution of Equations (5), (6) and (7) into Equation (4). The result is given by Equation (8).

$$dI_D = I_o \sin \theta \cos \theta\, d\theta\, d\phi \tag{8}$$

A solid angle $\psi$ and its differential as $\psi = \sin \theta\, d\theta\, d\phi$ are defined (see Weisstein, E. W., "Solid Angle" from MathWorld—A Wolfram Web Resource. http://mathworld.wolfram.com/SolidAngle.html [Online: Nov. 13, 2017]). The sound intensity per unit solid angle $dI_D/d\psi$ received as a function of the angle $\theta$ is then given by Equation (9) where it is seen that the intensity of sound generated by a distribution of near-surface dipole sources and observed at the submerged receiver 432 varies as the cosine of the zenith angle.

$$\frac{dI_D}{d\psi} = I_o \cos \theta \tag{9}$$

The total intensity $I_D$ at the acoustic receiver 432 due to the direct radiation of sound from the water surface 200 is calculated by a rearrangement of Equation (8) to yield equation (10).

$$I_D = \frac{I_o}{2} \int_0^{2\pi} \int_0^{\frac{\pi}{2}} \sin 2\theta\, d\theta\, d\phi = \pi I_o \tag{10}$$

Equation (10) shows that the total sound intensity due to a distribution of near-surface dipoles and propagated directly to the submerged receiver 432 (i.e., absent bottom reflections) is the same everywhere. However, Equation (9) shows that these sounds do not arrive at the acoustic receiver 432 with equal probability from all directions but instead have a distribution in angle from the zenith that varies with the cosine of that angle. Thus, the natural sound field in an open body of water satisfies one, but not both, of the criteria used to define a diffuse sound field (see American National Standard: Acoustical Terminology (2013) ANSI/ASA S1.1).

The contribution from the reflected acoustic paths 420, 422, 424 is now considered. The time averaged intensity of sound reflected from the bottom 406 is I' where $I_o$ is the time averaged acoustic intensity at the water surface 200 in watts per square meter, $R(\theta)$ is the intensity reflection coefficient of the bottom and $\theta$ is the zenith angle.

$$I'(\theta) = I_o R(\theta) \cos^2 \theta, \{\theta | 0 \leq \theta \leq \pi\} \tag{11}$$

It is a well-known physical principal that the value of the intensity reflection coefficient varies from 0 for a perfectly absorptive material to 1 for a perfectly reflective material such that $0 \leq R(\theta) \leq 1$ for all $\theta$ (See Kinsler, et. al. (1982) Fundamental of Acoustics, J. Wiley, New York, Chapter 6).

Referring again to FIG. 3, the reflected acoustic paths 420, 422, 424 contribute to the total acoustic intensity observed at the acoustic receiver 432. The first acoustic path 420 is identified by one bottom reflection m and zero surface reflections n. The indices m,n identify the number of bottom and surface reflections, respectively.

The second acoustic path 422 is identified by one bottom reflection and one surface reflection such that m=1 and n=1. The third acoustic path 424 is identified by two bottom reflections and one surface reflection such that m=2 and n=1.

Allowable ranges for the indices m,n are given by Equations (12) and (13). As these constraints show, the number of bottom reflections may vary from one to infinity. The number of surface reflections can be equal to, or one less than, the number of bottom reflections for any reflected acoustic path.

$$1 \leq m \leq \infty \tag{12}$$

$$m - 1 \leq n \leq m \tag{13}$$

The intensity contributed by each indexed acoustic path (m,n) is estimated as the differential intensity $dI'_{m,n}$ due to sound arriving on the acoustic path index (m,n) is given by Equation (14) where it is again assumed the well-known dipole radiation pattern for the near surface sources 300.

$$dI'_{m,n} = \frac{I_o R(\theta)^m \cos^2 \theta}{l^2_{m,n}} dA'_{m,n} \tag{14}$$

The range of zenith angles over which the acoustic intensity is received varies according to the last boundary reflection before arriving at the acoustic receiver 432. In cases where the last reflecting boundary is the bottom 406 such that n=m−1, the sound arrives from angles between $\pi/2$ and $\pi$ (i.e., 90° and 180°). In cases where the last reflecting boundary is the water surface 200 such that n=m, the sound arrives from angles between 0 and $\pi/2$ (i.e., 0° and 90°) as shown in FIG. 3 and by Equation (15).

$$0 \leq \theta < \pi/2; n = m$$

$$\pi/2 < \theta \leq \pi; n = m - 1 \tag{15}$$

The differential area $dA'_{m,n}$ from which sounds are radiated is determined in Equation (16) where $r'_{m,n}$ is the horizontal distance from the acoustic receiver 432 to the source of sound, $dr'_{m,n}$ is the differential distance and $d\phi$ is the azimuth angle in standard spherical coordinates.

$$dI'_{m,n} = \frac{I_o R(\theta)^m \cos^2 \theta}{l^2_{m,n}} r'_{m,n} dr'_{m,n} d\phi \tag{16}$$

The horizontal distance $r'_{m,n}$ for sound having undergone m bottom reflections is given by Equation (17). Note that two acoustic transmission paths are associated with a path having m bottom reflections; a shorter reflected acoustic path 420 that has undergone n=m−1 surface reflections, and a longer acoustic path 422 that has undergone n=m surface reflections.

The differential distances $dr'_{m,n}$ are given by Equation (18) as the differential of Equation (17). The distances $l'_{m,n}$ from the image source 410 of FIG. 2 to the acoustic receiver 432 are given by Equation (19).

$$r'_{m,n} = \begin{cases} (2mZ + h)\tan\theta; & n = m \\ (2mZ - h)\tan(\pi - \theta); & n = m - 1 \end{cases} \qquad (17)$$

$$dr'_{m,n} = \begin{cases} (2mZ + h)\sec^2\theta d\theta; & n = m \\ (2mZ - h)\sec^2(\pi - \theta)d\theta; & n = m - 1 \end{cases} \qquad (18)$$

$$l'_{m,n} = \begin{cases} (2mZ + h)\sec\theta; & n = m \\ (2mZ - h)\sec(\pi - \theta); & n = m - 1 \end{cases} \qquad (19)$$

The differential intensity $dI'_{m,n}$ at the acoustic receiver 432 due to multiply reflected sound received over path index (m,n) is given by Equation (20) following the substitution of Equations (17), (18) and (19) into Equation (16). Note that the leading term on the right hand side of Equation (20) accounts for the sign of the trigonometric functions over the range of zenith angles $0 \le \theta \le \pi$ for reflected acoustic paths arriving from above (i.e., n=m) and from below (i.e., n=m−1) the receiver 432.

$$dI'_{m,n} = (-1)^{(m-n)} I_o R(\theta)^m \sin\theta \cos\theta d\theta d\phi \qquad (20)$$

Similar to the case for sound propagating on a direct acoustic path; the sound propagating on a reflected acoustic path generates an intensity per unit solid angle $dI'_{m,n} d\psi$ received as a function of the angle θ given by Equation (21) where it is seen that the intensity of sound generated by a distribution of near surface dipole sources and observed at the receiver 432 is a function of the zenith angle and intensity reflection coefficient of the bottom 406.

$$\frac{dI'_{m,n}}{d\psi} = (-1)^{(m-n)} I_o R(\theta)^m \cos\theta \qquad (21)$$

Equation (21) shows that the differential intensity received over different reflected acoustic paths varies with the number of bottom reflections, where each reflection reduces the intensity of sound by a factor equal to the intensity reflection coefficient R(θ). Thus, sound having undergone one, two or three bottom reflections is reduced respectively by the factor R(θ), R(θ)$^2$ or R(θ)$^3$.

If the intensity reflection coefficient of the bottom 406 is assumed to be constant, as described by Equation (22), then R(θ)=R is a constant. Here, it is also assumed without loss of generality that the maximum intensity reflection coefficient is assumed to be arbitrarily close to, but less than unity=1 such that 0≤R<1.

$$\frac{\partial R}{\partial \theta} \sim 0 \qquad (22)$$

The intensity received for a reflected acoustic path index (m,n) is then calculated by the integration of Equation (20). The approximation of Equation (22) with Equation (23) is used as the result. Consideration of the problem symmetry results in a change to the limits of integration for the zenith angle to 0≤θ≤π/2 for all reflected acoustic paths.

$$I'_{m,n} \cong \frac{R_m I_o}{2} \int_0^{2\pi} \int_0^{\frac{\pi}{2}} \sin 2\theta d\theta d\phi = \pi R^m I_o \qquad (23)$$

The time averaged reflected intensity r at the acoustic receiver 432 is approximated as the sum of the intensities received on numerous reflected acoustic paths indexed as (m,n) where m is the number of bottom reflections, n is the number of surface reflections, R is the intensity reflection coefficient and $I_o$ is the time averaged intensity radiated vertically from a uniform distribution of near-surface dipoles.

$$I' \cong \pi I_o \sum_{m=1}^{\infty} \sum_{n=m-1}^{m} R^m = 2\pi I_o \sum_{m=1}^{\infty} R^m \qquad (24)$$

The time averaged intensity at the acoustic receiver 432 is then the sum of the direct (See Equation (10)) and reflected intensities $I = I_D + I'$. Using Equation (24), the time averaged intensity is given by Equation (25).

$$I \cong \pi I_o \left(1 + 2\sum_{m=1}^{\infty} R^m\right) = \pi I_o \left(1 + \frac{2R}{1-R}\right) \qquad (25)$$

Equation (25) is simplified to yield equation (26) as the total intensity observed at the acoustic receiver 432 due to a uniform random distribution of dipole sources with a mean intensity $I_o$ at the water surface 200, where the intensity reflection coefficient R of the bottom is independent of a grazing angle and is less than unity such that 0≤R<1.

$$I \cong \pi I_o \left(\frac{1+R}{1-R}\right) \qquad (26)$$

Important properties of the natural sound field in an open body of water due to the actions of wind and waves on the water surface 200 are indicated by the following analysis.

First, Equation (25) shows that the total sound field intensity does not vary with distance from the water surface 200 or the bottom 406. This means that the sound field intensity observed by the device under test hydrophones of the hydrophone line array 100 affixed to the text fixture 10 shown in FIG. 1 does not vary with location on the text fixture (which can differ by a few meters). This is also true for the reference hydrophones 40 that are affixed to the text fixture 10.

Therefore, neglecting acoustic reflections and scattering from the text fixture 10 itself, the devices under test hydrophones of the hydrophone line array 100 and calibrated reference hydrophones 40 that are distributed over the spatial extent of the text fixture observe the same acoustic intensity. The issue of scattering and reflections from the text fixture 10 are discussed when considering the uncertainties in the free-field voltage sensitivity moduli returned by this calibration method.

Second, the analysis invoked simplifying approximations to facilitate consideration of sound field properties that are important to the calibration of the hydrophone line array 100. The extent to which these approximations are not represented in the natural environment influence the measurement and possibly introduce measurement errors. The potential for measurement errors due to differences between the environment assumed by the analysis and the real environment are discussed when considering uncertainties in the free-field voltage sensitivity moduli returned by the calibration method.

Lastly, consideration of Equations (9) and (21) shows that the acoustic intensity does not arrive from all directions with equal probability. Instead, the greatest sound intensity is received at zenith angles near vertical due to the directional radiation pattern of the assumed dipole source distribution. Therefore, the sound field is not diffuse as defined by national standards (See "American National Standard: Acoustical Terminology" (2013) ANSI/ASA S1.1) and does not satisfy the sound field requirement stipulated in diffuse sound field microphone calibration methods known in the prior art (See Beranek, L. L. (1988) Acoustical Measurements, 2nd Ed., American Institute of Physics, pp. 633-635). This aspect of the natural sound field results in a constraint to the field of applicability.

As stated throughout, the desired measurement is the modulus of the free-field voltage sensitivity $M_{ff}$ of the hydrophones in the hydrophone line array 100, defined as the ratio of the open circuit voltage output by the hydrophone to the acoustic pressure at the hydrophone when excited by a progressive wave field in an unbounded medium. That is, absent any contribution from boundary reflections.

However, the acoustical measurements employed herein are performed using an arbitrary sound field with quasi-diffuse properties; thus the actual measurement may be closer to the diffuse-field voltage sensitivity $M_{df}$ rather than the free-field sensitivity $M_{ff}$. It will now be shown that subject to certain constraints; the two quantities will be equal.

The directivity factor D of a directional hydrophone is defined as the ratio of the power output by an omnidirectional hydrophone and the power output by the directional hydrophone when both hydrophones are ensonified by an isotropic (i.e., diffuse) noise field and defined by Equation (27) as $$D = \frac{4\pi}{\int_{4\pi} b^2(\theta, \phi) d\Omega} \quad (27)$$

where b is the directional response of the hydrophone which is less than or equal to unity, $\theta$ and $\phi$ are the zenith and azimuth angles, and $d\Omega$ is the differential solid angle $d\Omega = \sin\theta d\theta d\phi$ (See Kinsler, et. al., Fundamentals of Acoustics 4th Ed. (2000) J. Wiley, pp. 188-190).

The diffuse-field voltage sensitivity $M_{df}$ of a hydrophone is defined as the ratio of the root-mean-squared (rms) open circuit voltage output by the hydrophone 432 and the rms acoustic pressure in the diffuse-sound field at the hydrophone. If the hydrophone 432 is not omnidirectional (i.e., $b=b(\theta,\phi)$ and D>1) then the two sensitivities are different and are related by the directivity factor D as shown in Equation (28).

$$M_{df} = DM_{ff} \quad (28)$$

If a hydrophone is omnidirectional (i.e., $b(\theta,\phi)=1$ and D=1), then the diffuse-sound and free-field voltage sensitivities are the same and a diffuse-sound field can measure the free-field voltage sensitivity of the hydrophone (See Bobber, R. J., Underwater Electroacoustic Measurements (1988) Peninsula Publishing, Los Altos, pp. 41).

Equation (27) can be modified to define a parameter that is similar to the directivity factor D of Equation (28), but defined for a sound field with an arbitrary angular distribution $I=I(\theta,\phi)$. Thus, a factor $F_{af}$ is defined relating the power output by an omnidirectional hydrophone ensonified by an arbitrary sound field $I(\theta,\phi)$ to the power output by the directional hydrophone when ensonified by the same arbitrary sound field and given as Equation (29).

Equation (29) shows that if the sound field intensity is independent of angle such that $I(\theta,\phi)$,=constant then Equation (29) reduces to Equation (27), the case for an isotropic noise field referenced in the definition of directivity factor D.

$$F_{af} = \frac{\int_{4\pi} I(\theta, \phi) d\Omega}{\int_{4\pi} I(\theta, \phi) b^2(\theta, \phi) d\Omega} \quad (29)$$

The free-field $M_{ff}$ and arbitrary field $M_{af}$ sensitivities for a directional device are related by the factor $F_{af}$ for an arbitrary noise field to arrive at Equation (30).

$$M_{af} = F_{af} M_{ff} \quad (30)$$

In the case of an omnidirectional hydrophone where $b(\theta,\phi)=1$ for all angles $\theta$ and $\phi$, the factor $F_{af}=1$ and the free-field $M_{ff}$ and arbitrary field $M_{af}$ sensitivities are equal as shown by Equation (31).

$$M_{af} = M_{ff}; \ b(\theta,\phi)=1 \text{ for all } \theta,\phi \quad (31)$$

Equation (31) represents a constraint on the field of applicability. In particular, the free-field voltage sensitivity $M_{ff}$ of a device under test hydrophone may be determined from acoustical measurements performed in an arbitrary (e.g., quasi-diffuse) sound field if the device under test hydrophone and the reference hydrophone 40 used for the comparison are both omnidirectional.

A sufficient condition to ensure that a hydrophone is omnidirectional is illustrated by consideration of the open-circuit voltage sensitivity M $$M = \frac{v_{oc}}{\langle p \rangle} = \frac{v_{oc}}{\frac{1}{A}\int_A p(A) dA} \quad (32)$$

where $v_{oc}$ is the open-circuit voltage output by the hydrophone, A is the surface area of the hydrophone, and p is the acoustic pressure. Thus, the hydrophone sensitivity M is simply the ratio of the open-circuit voltage output $v_{oc}$ of the hydrophone to the average pressure (p) operating on the sensitive surface of the hydrophone.

For the purpose of this description, the device under test hydrophone of the hydrophone line array 100 is constrained to be small with respect to an acoustic wavelength, such that ka<<1 where $k=2\pi/\lambda$ is the acoustic wavenumber, $\lambda$ is the acoustic wavelength and a is a characteristic dimension of the hydrophone (e.g., radius). When applied, this constraint results in a uniform pressure p on the hydrophone surface A and Equation (32) is simplified to yield $$M = \frac{v_{oc}}{p}; ka \ll 1 \quad (33)$$

as the sensitivity irrespective of an angular dependence of the incident sound field.

Properties of the natural sound field in an open body of water that are relevant and shown in the preceding analysis, are summarized in that the natural sound field in an open body of water is generated by a uniform random distribution of near surface sources due to wind and waves. Each source radiates sound into the water with a directional dependence that varies approximately with the cosine of the zenith angle. The intensity of sound arriving at the test fixture 10 includes contributions from a direct acoustic path between the distribution of near surface sources and receiver(s) and multiple reflected acoustic paths with a varying number of bottom and surface reflections.

The total intensity of sound in the water does not vary with location in the body of water, most importantly throughout the volume of the submerged test fixture; the intensity of sound received includes an angular dependence whereby the greatest sound intensity is received from angles near vertical; and the sound field satisfies neither the free-field conditions required by most hydrophone calibration methods, nor the diffuse-field conditions required by microphone calibration methods known in the prior art.

Finally, the modulus of the free-field voltage sensitivity of the device under test hydrophone can be measured in an arbitrary sound field, to include a quasi-diffuse sound field in an open body of water, if the device under test hydrophone and the reference hydrophone 40 used for the comparisons are small with respect to an acoustic wavelength over the calibration frequency band.

The following discussion adopts a notational convention where subscripts identify the hydrophone associated with a given parameter and parenthetical superscripts indicate the individual observations that constitute an ensemble. All description prior to this paragraph is proof that the physics of the present invention is valid. Everything that follows this paragraph is practical implementation of the present invention.

The modulus of the frequency dependent sensitivity $|M_i(f)|$ of the $i^{th}$ hydrophone data channel in the towed sensor array 100 is computed from time dependent measurements of the voltage output by that hydrophone $v_i^{(k)}(t)$ and by the time dependent voltages observed by a plurality J of reference hydrophones 40 $v_1^{(k)}(t), v_2^{(k)}(t), \ldots, v_J^{(k)}(t)$ as the ensemble average of K acoustic comparisons between the J calibrated reference standard hydrophones and the $i^{th}$ array hydrophone. It is computed as $$|M_i(f)| = \frac{1}{JK} \sum_{k=1}^{K} \sum_{j=1}^{J} \frac{|V_i^{(k)}(f)|}{|V_j^{(k)}(f)|} |M_j(f)| \quad (34)$$

where $V_i^{(k)}(f)$ is the $k^{th}$ voltage spectrum observed by the $i^{th}$ array hydrophone and is computed as the Fourier Transform of the voltage time history $v_i^{(k)}(t)$. The voltage spectrum $v_j^{(k)}(f)$ observed by the $j^{th}$ calibrated reference is likewise computed as the Fourier Transform of the $k^{th}$ voltage time history $v_j^{(k)}(t)$. The voltage sensitivity of the $j^{th}$ calibrated reference is $M_j(f)$ and f is frequency. Vertical brackets represent the modulus of a complex quantity.

In certain cases, such as for towed sensor arrays designed to measure broadband noise processes, it is advantageous to express the sensitivity of the device under test hydrophone as the average value across a frequency band $W = f_2 - f_1$ such that $f_1 < f_2$. Commonly used frequency bands include a fixed bandwidth of one Hz for the measurement of spectrum level and proportional bandwidths based on a set of preferred frequencies for acoustical measurements (see Preferred Frequencies and Filter Band Center Frequencies for Acoustical Measurements (2016) ANSI/ASA S1.6).

The modulus of the band averaged sensitivity $|M_i|$ of the $i^{th}$ hydrophone across a finite bandwidth W that spans the range of frequencies $f_1, f_2$ is given by Equation (34) where the frequency dependence f is suppressed for notational convenience.

$$|M_i(W)| = \frac{1}{JKW} \sum_{k=1}^{K} \sum_{j=1}^{J} \int_{f_1}^{f_2} \frac{|V_i^{(k)}|}{|V_j^{(k)}|} |M_j| df \quad (35)$$

Hydrophone sensitivities computed by using Equation (34) or Equation (35) include not only the ordinary measurement uncertainty associated with any measurement process, but may include uncertainties due to differences between the statistical properties of the sound field as expressed by Equation (25) and the actual properties of the sound field in which the calibration measurements are performed.

In particular, Equation (26) describes a total sound field intensity that does not vary with location in the water column. The extent to which the actual acoustic field intensity does vary with location contributes to the uncertainties in sensitivities computed using Equation (34) or (35). While measurement uncertainty is reduced by taking the ensemble average of the sensitivities computed from the device under test and the reference hydrophones 40 distributed over the test fixture 10, an estimate of the measurement uncertainty is still required.

Standard procedures for estimation of measurement uncertainty decompose the combined standard uncertainty into a Type A component that is determined by the statistical analysis of repeated measurements and a Type B component that is the product of "scientific judgement based on all available information" (see Evaluation of Measurement Data—Guide to the Expression of Uncertainty in Measurement (2008) JCGM 100:2008, Bureau International des Poids et Mesures, Paris, France).

Significant contributors to the Type A uncertainty include a relatively low signal-to-noise ratio (SNR) and variations in the sound field intensity with locations due to differences between the assumed and actual sound generation mechanisms; the presence of the test fixture 10 in the sound field; and any local sources of sound that may exist near the test fixture.

The Type B uncertainty includes contributions from uncertainties in the reference sensitivities, uncertainties in the data processor signal conditioning and analog-to-digital conversion electronics, electrical losses in cables used to transmit the electrical signals and any electromagnetic interference that may exist. Among these contributions, the uncertainty in sensitivity of the reference hydrophones is likely to dominate the Type B component of the combined standard uncertainty.

The Type B uncertainty can thus be approximated by the uncertainty of the reference standard calibrations. The standard uncertainty (i.e., $\pm 1\sigma$) of the calibration provided with the reference standard hydrophone 40 is approximately three percent when the calibration is performed by a highly qualified laboratory, such as a national metrology institute (NMI). This corresponds to an expanded uncertainty for the reference of $\pm 0.5$ dB when expressed at a 95% confidence level (See Robinson, S. P., et. al. (2006) "An International Key Comparison of Free-Field Hydrophone Calibrations in the Frequency Range 1 to 500 kHz," J. Acoust. Soc. Am., vol. 120, pp. 1366-1373).

The combined standard uncertainty $u_i$ for the $i^{th}$ device under test is then the root-sum-squares of the Type A and Type B components as given by Equation (36).

$$u_i = \sqrt{u_{iA}^2 + u_{iB}^2} \tag{36}$$

An unbiased estimate of the total measurement variance $\sigma_i^2$ for the $i^{th}$ device under test is provided by the sample variance $s_i^2$ of the measured data as $$s_i^2 = \frac{1}{JK-1} \sum_{k=1}^{K} \sum_{j=1}^{J} (|M_{ijk}| - |M_i|)^2 \tag{37}$$

where $M_{ijk}$ is the $k^{th}$ sensitivity computed for the $i^{th}$ device under test hydrophone by comparison with the $j^{th}$ reference hydrophone and the estimated combined standard uncertainty is $u_i = \sqrt{s_i^2}$. Note that Equation (37) treats the uncertainty in the calibrated reference sensitivity as a Type A component since the uncertainty is included in the sample variance of the measurements.

The sample variance for the sensitivity modulus $|M_i|$ of the $i^{th}$ device under test based only on comparisons with the $j^{th}$ calibrated reference is given by Equation (38). It is expressed for a given pair of sensors as s and computed across an ensemble of K sensitivity measurements $|M_{ijk}|$ for the $i^{th}$ device under test by comparison with the $j^{th}$ reference. Thus, a total of J sample variances are computed for each device under test hydrophone and one for each device under test hydrophone reference standard pairing by the equation $$s_{ij}^2 = \frac{1}{K-1} \sum_{k=1}^{K} (|M_{ijk}| - |M_i|)^2 + u_{Ref}^2 \tag{38}$$

where $u_{Ref}$ is the combined standard uncertainty in the reference hydrophone calibrations, and is treated here as a Type B component in the calibration measurement process.

Using Equation (38) to compute sample variances $s_{ij}^2$ from K observations between pairs of sensors i,j provides for identification and isolation of problems with the measurement process, such as might result from significant variations in the sound field intensity within the spatial domain of the test fixture 10 or elevated electronic noise levels in the device under test hydrophone and/or the reference hydrophones 40. Thus, a consistent measurement process will yield variances computed using Equations (37) and (38) that are approximately equal such that $s_i^2 \cong s_{ij}^2 + u_{Ref}^2$ for all cases.

An important reason for calibrating a hydrophone line array is to verify that the hydrophone sensitivities are equal to the specified value within a manufacturing tolerance, usually expressed as $M \pm \Delta M$ where M is the specified sensitivity and $\Delta M$ is the manufacturing tolerance, or an allowable deviation from the specified value which is typically expressed as decibels (i.e., dB re 1V/uPa). An example of a calibration result for a hydrophone data channel is provided in FIG. 5 in which the specified free-field voltage sensitivity is −160 dB re 1V/uPa, the manufacturing tolerance is ±1 dB, and the passband is 20 Hz to 8 kHz.

The figure provides a vertical axis depicting the value of the free-field voltage sensitivity and a horizontal axis depicting the frequency value. The specified sensitivity of the hydrophone channel is shown as a solid line 500. The upper and lower bounds for sensitivities that satisfy the specification are respectively shown as dotted lines 502 and 504. Individual device under test sensitivities calculated from measured data with Equation (35) and converted to decibels with standard engineering practice (i.e., $M_{dB} = 20 \log_{10}(|M|)$) are shown with circular markers 506 where the band averaged sensitivities are provided across the standard one third octave band frequency set (see Preferred Frequencies and Filter Band Center Frequencies for Acoustical Measurements (2016) ANSI/ASA S1.6).

Combined expanded measurement uncertainties $U_i$ are shown by error bars 508 such that the true value of the free-field voltage sensitivity is in the range of sensitivities spanned by the error bars with a ninety-five percent level of confidence. The true value of the free-field voltage sensitivity is calculated using standard methods for the expression of measurement uncertainty (See Evaluation of Measurement Data—Guide to the Expression of Uncertainty in Measurement (2008) JCGM 100:2008, Bureau International des Poids et Mesures, Paris, France) where the combined standard uncertainty $u_i$ is computed as the square root of the combined sample variance $s_i^2$ given by Equation (37). The combined standard uncertainty is then given as $u_i = \sqrt{s_i^2}$ for each measured sensitivity $|M_i|$.

The combined expanded uncertainty $U_i$ is then computed by application of an expansion factor of two for a confidence interval of ninety-five percent. Thus, the true value of the measured sensitivities lay in the range $|M_i| \pm U_i$ with a ninety-five percent probability. The result, when converted to decibels, is Equation (39).

$$20\log_{10}(|M_i|) \pm 20\log_{10}\left(1 + \frac{2u_i}{|M_i|}\right) dB \ re \ 1 \ V/uPa \tag{39}$$

The calibration approach whereby the measured sensitivities may be expressed with a mean value $|M_i|$ and a sample variance $s_i^2$ based on statistical analysis facilitates a risk based approach when assessing pass/fail criteria for a hydrophone line array. Since the cost of a hydrophone line array can be quite high, the risk of rejecting an array that actually satisfies the manufacturing tolerance is to be avoided.

Figure 5:
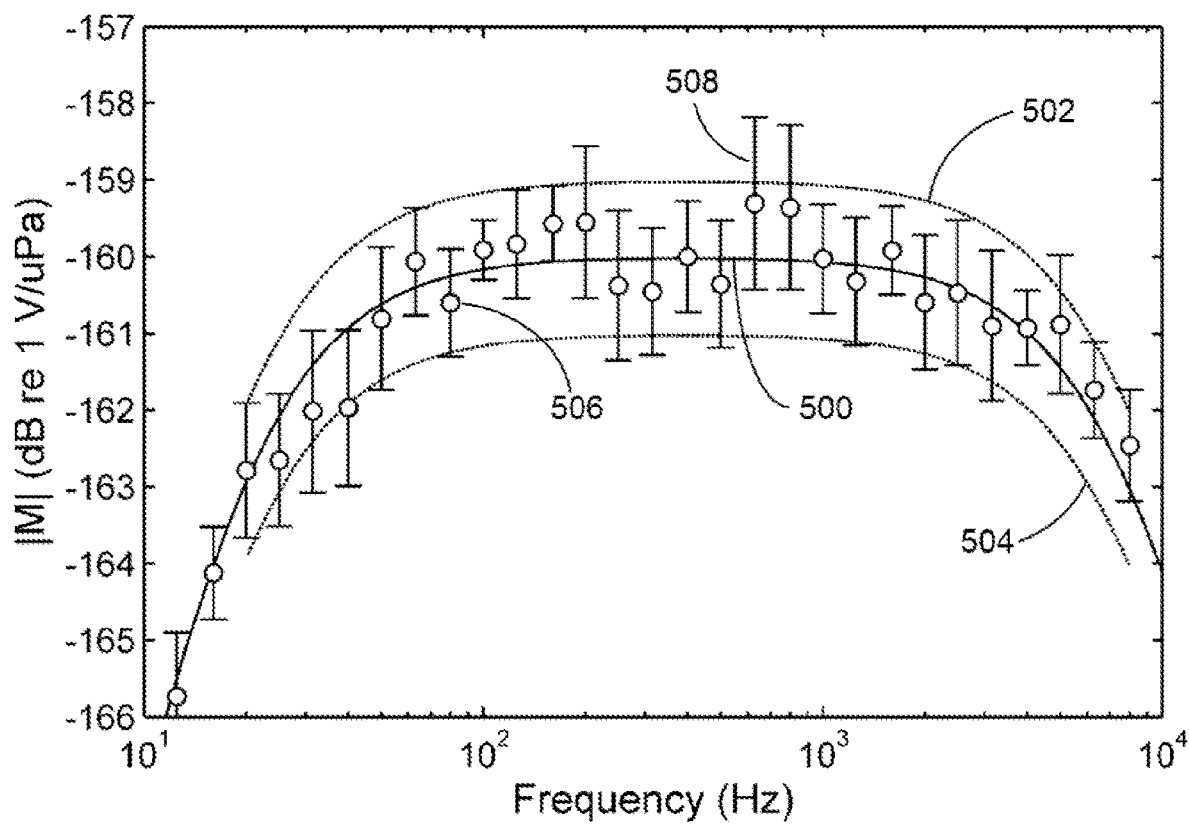
FIG. 5 is a diagram showing the result of a calibration measurement performed using the method of the present invention.

For example, data illustrated in FIG. 5 indicates that the measured sensitivity $|M_i|$ at 40 Hz is a relatively small distance outside the defined acceptance criteria. However, when the expanded measurement uncertainty $U_i$ as indicated by the error bar is also considered; the probability that the true value of the free-field voltage sensitivity actually failed the defined acceptance criteria is slightly greater than fifty percent. Given the potentially high cost associated with rejecting a manufactured array; it may be preferable to accept this out-of-tolerance measurement if the risk can be quantified.

The method can represent the measured sensitivities $|M_i|$ not as discrete values, but as a set of probability density functions $P_i$ for the sensitivity of each hydrophone expressed at each frequency f or frequency band W. Assuming normally distributed data, the probability density function $P_i$ for the true value $|M_T|$ of the sensitivity of the $i^{th}$ hydrophone at frequency f (or in frequency band W) is given by the well-known Gaussian distribution as shown in Equation (40).

$$P_i(|M_T|) = \frac{1}{s_i\sqrt{2\pi}} e^{\frac{-(|M_T|-|M_i|)^2}{2s_i^2}} \tag{40}$$

Since the true hydrophone sensitivity is represented as a probability density function, the sensitivity can be integrated across the range of acceptable sensitivity defined by the manufacturing specification $M \pm \Delta M$ for a given frequency f or band W using standard statistical methods (see Bendat, J. S. and Piersol, A. G. (2000) Random Data Analysis and Measurement Procedures, $3^{rd}$ Ed., J. Wiley & Sons, pp. 48-53). Thus, the cumulative probability $C_i$ that the true sensitivity $|M_T|$ of the $i^{th}$ hydrophone lay on the interval $M \pm \Delta M$ (expressed in linear engineering units as V/uPa) is provided by Equation (41). The probability that the hydrophone does not satisfy the specification is $1-C_i$.

$$C_i = \frac{1}{s_i\sqrt{2\pi}} \int_{M-\Delta M}^{M+\Delta M} e^{\frac{-(|M_T|-|M_i|)^2}{2s_i^2}} d|M_T| \tag{41}$$

The method can measure the modulus of the complex sensitivity of the data channels in a hydrophone line array across a broad range of frequencies using a natural sound field in an open body of water as the calibration signal. One significant aspect of this invention is the contrast between the carefully engineered (and expensive) diffuse sound field of prior art calibrations and the naturally occurring quasi-diffuse sound field taught by the invention.

The diffuse sound field in the prior art microphone calibration method results from signals transmitted by a single acoustic source interacting with carefully engineered boundaries designed to disrupt discrete room modes and to diffuse the sound energy evenly throughout the volume of the room where the calibration measurements are performed.

Contrast this with the quasi-diffuse sound field recognized by this invention whereby the sound field is created naturally by a random distribution of acoustic sources operating at, or near, the surface of an open body of water by the action of wind and waves. Generated sounds then interact with a pair of parallel boundaries (bottom and surface) to create a quasi-diffuse sound field despite the symmetry of the acoustic volume in which the calibration measurements are performed.

By dispensing with the acoustic projector, the invention avoids the problems of the interaction of a spherically divergent and coherent sound field with a cylindrically symmetric measurement apparatus. Because the sound field that is incident on the test fixture 10 is quasi-diffuse, the sound field lacks the well-defined symmetry and coherence that characterizes calibration signals transmitted by the acoustic projectors required by traditional calibration methods.

As a result, the scattered/reflected sound field is similarly diffuse and incoherent; thereby, resulting in a more uniform time averaged intensity throughout the volume occupied by the test fixture 10. Additional benefits derive from the calibrated reference hydrophones used to observe the sound field include providing an improved estimate of the temporal and spatial average of sound intensity throughout the measurement volume and estimating uncertainty in the calibration measurements for the hydrophones that are calibrated.

While this method is suitable for calibrations over a broad and high span of frequencies ranging up to 10 kHz; the greatest known advantage is at higher frequencies where the methods taught by the prior art have significant disadvantages due to scattering and reflection of acoustic signals transmitted by an acoustic projector.

An alternative to the method is to separately calibrate each hydrophone in an array using a measurement apparatus or a test fixture that does not introduce unwanted acoustic scattering and reflections of calibration signals transmitted by an acoustic projector. While such methods are effective, the methods do not retain the efficiency associated with the simultaneous calibration of towed array hydrophones numbering in the hundreds. As such, the methods take significantly more time, with commensurately increased cost, to calibrate a towed line array.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for measuring a modulus of free-field voltage sensitivity for a hydrophone over a range of frequencies using a naturally occurring quasi-diffuse sound field in a body of water, said method comprising the steps of:

providing a cylindrical test fixture, a plurality of calibrated reference standard hydrophones and a data processor;

arranging an array of hydrophones into a cylindrical volume on the test fixture;

submerging the test fixture and the reference hydrophones;

identifying a uniform distribution of sound sources located at approximately a quarter wavelength beneath a surface of the water with identification by a directional radiation pattern of at least one acoustic signal produced by the sound sources to a location within the body of water wherein a total intensity field includes a direct acoustic path of the directional radiation pattern and a sum of reflected paths that have an angular distribution of acoustic signal intensity that varies as $\cos^x \theta$ wherein $\theta$ is an angle with respect to a zenith and $x=2$;

acquiring at least one acoustic signal of the sound sources with at least one hydrophone of the array of hydrophones at the location;

transmitting the least one acoustic signal from the at least one hydrophone of the array of hydrophones to the data processor; and measuring the modulus of the free-field voltage sensitivity of the at least one hydrophone i of the array of hydrophones from time dependent measurements of voltage output by the at least one hydrophone and by time dependent voltages observed by the plurality of reference hydrophones J as an ensemble average of K acoustic comparisons between the calibrated reference hydrophones and the at least one array hydrophone, with the modulus of the free-field voltage sensitivity computed as $$|M_i(f)| = \frac{1}{JK}\sum_{k=1}^{K}\sum_{j=1}^{J}\frac{|V_i^{(k)}(f)|}{|V_j^{(k)}(f)|}|M_j(f)|$$

where $V_i^{(k)}(f)$ is a $k^{th}$ voltage spectrum observed by the at least one array hydrophone and is computed as the Fourier Transform of a voltage time history $v_i^{(k)}(t)$ with a voltage spectrum $V_j^{(k)}(f)$ observed by the at least one array hydrophone is likewise computed as the Fourier Transform of a $k^{th}$ voltage time history $v_j^{(k)}(t)$ with a voltage sensitivity of the calibrated reference hydrophone being $M_j(f)$ and f is frequency.

2. The method in accordance with claim 1, said method further comprising the step of determining a modulus of a frequency band averaged sensitivity of the at least one hydrophone across a finite bandwidth W to span a range of frequencies $f_1, f_2$ by the equation $$|M_i(W)| = \frac{1}{JKW}\sum_{k=1}^{K}\sum_{j=1}^{J}\int_{f_1}^{f_2}\frac{|V_i^{(k)}|}{|V_j^{(k)}|}|M_j|df.$$

3. The method in accordance with claim 1, said method further comprising the step of estimating measurement uncertainty based on a combined standard uncertainty $u_i$ for the at least one array hydrophone of a Type A component determined by a statistical analysis of repeated measurements and a Type B component determined by scientific judgement based on available information with measurement uncertainty estimated by the equation $$u_i = u_{iA}^2 + u_{iB}^2;$$

wherein contributors to the Type A uncertainty comprise a relatively low signal-to-noise ratio and variations in sound field intensity with locations due to differences between assumed and actual sound generation mechanisms, a presence of the test fixture in the sound field, and sources of sound that are proximate to the test fixture;

wherein contributors to the Type B uncertainty comprise uncertainties in reference sensitivities, uncertainties in data processor signal conditioning and analog-to-digital conversion electronics, electrical losses in cables used to transmit the electrical signals and any electromagnetic interference that may exist.

4. The method in accordance with claim 3, said method further comprising the steps of:

utilizing a sample variance $s_i^2$ of the measured data as $$s_i^2 = \frac{1}{JK-1}\sum_{k=1}^{K}\sum_{j=1}^{J}(|M_{ijk}| - |M_i|)^2$$

where $M_{ijk}$ is a $k^{th}$ sensitivity computed for the at least one array hydrophone by comparison with the calibrated reference hydrophone and $|M_i|$ being the sensitivity modulus of the at least one array hydrophone; and determining a total sample variance as $s_{ij}^2$ by the equation $$s_{ij}^2 = \frac{1}{K-1}\sum_{k=1}^{K}(|M_{ijk}| - |M_i|)^2 + u_{Ref}^2$$

where $u_{Ref}$ is the combined standard uncertainty in the calibrated reference hydrophone as a Type B uncertainty such that the total sample variances $s_{ij}^2$ from K observations between the at least one array hydrophone and the calibrated reference hydrophone provides for identification and isolation of measurement problems.

5. The method in accordance with claim 4, said method further comprising the steps of:

identifying a measurement uncertainty where a combined standard uncertainty $u_i$ of the at least one array hydrophone is computed as a square root of the sample variance $s_i^2$ by the equation $u_i = \sqrt{s_i^2}$; and identifying a combined expanded uncertainty $U_i$ by applying an expansion factor of two for a confidence interval of ninety-five percent such that the true value of free-field voltage sensitivity is in the range $|M_i| \pm U_i$ with a ninety-five percent probability.

6. The method in accordance with claim 5, wherein the measured sensitivities $|M_i|$ are represented as probability density functions $P_i$ for a true value $|M_T|$ sensitivity of the at least one array hydrophone expressed at each frequency f as well as at each frequency band W by the equation $$P_i(|M_T|) = \frac{1}{s_i\sqrt{2\pi}}e^{\frac{-(|M_T|-|M_i|)^2}{2s_i^2}}.$$

7. The method in accordance with claim 6, wherein said method further comprises the step of determining a cumulative probability $C_i$ that the true value $|M_T|$ of the at least one array hydrophone lay on the interval $M \pm \Delta M$ by the equation $$C_i = \frac{1}{s_i\sqrt{2\pi}}\int_{M-\Delta M}^{M+\Delta M} e^{\frac{-(|M_T|-|M_i|)^2}{2s_i^2}}d|M_T|.$$

* * * * *